United States Patent [19]
O'Reilly

[11] 3,754,177
[45] Aug. 21, 1973

[54] SOLID STATE CONTROLLER
[75] Inventor: Royal V. O'Reilly, Long Beach, Calif.
[73] Assignee: Lectron Corporation, Carson, Calif.
[22] Filed: Sept. 5, 1972
[21] Appl. No.: 286,412

[52] U.S. Cl................ 318/480, 318/313, 250/209, 315/156
[51] Int. Cl. ............................................ H02p 9/00
[58] Field of Search................ 318/313, 480, 221 R; 250/208, 209; 315/156

[56] References Cited
UNITED STATES PATENTS

| | | | |
|---|---|---|---|
| 3,412,257 | 11/1968 | Miller et al. | 250/208 X |
| 3,424,967 | 1/1969 | Keller | 318/345 |
| 3,531,684 | 9/1970 | Nuckolls | 250/209 X |
| 3,660,752 | 5/1972 | Pfeffer | 318/313 X |
| 3,694,692 | 9/1972 | Pressman | 315/156 |

*Primary Examiner*—B. Dobeck
*Attorney*—Ford W. Harris, Jr., Wolton Eugene Tinsley et al.

[57] ABSTRACT

A solid state circuit for slow turn on and turn off of power to a load to limit surges and transients normally associated with the switching of large loads. A thyristor and a switching unit for turning the thyristor on and off, with a phase shift network in the switching unit for turn on time control. A radiation sensitive resistor in the phase shift network illuminated by a source in turn energized by a porportional control circuit having a time delay for build-up and decay of illumination. A two-step delay circuit, and a circuit suitable for single phase and three phase systems.

12 Claims, 3 Drawing Figures

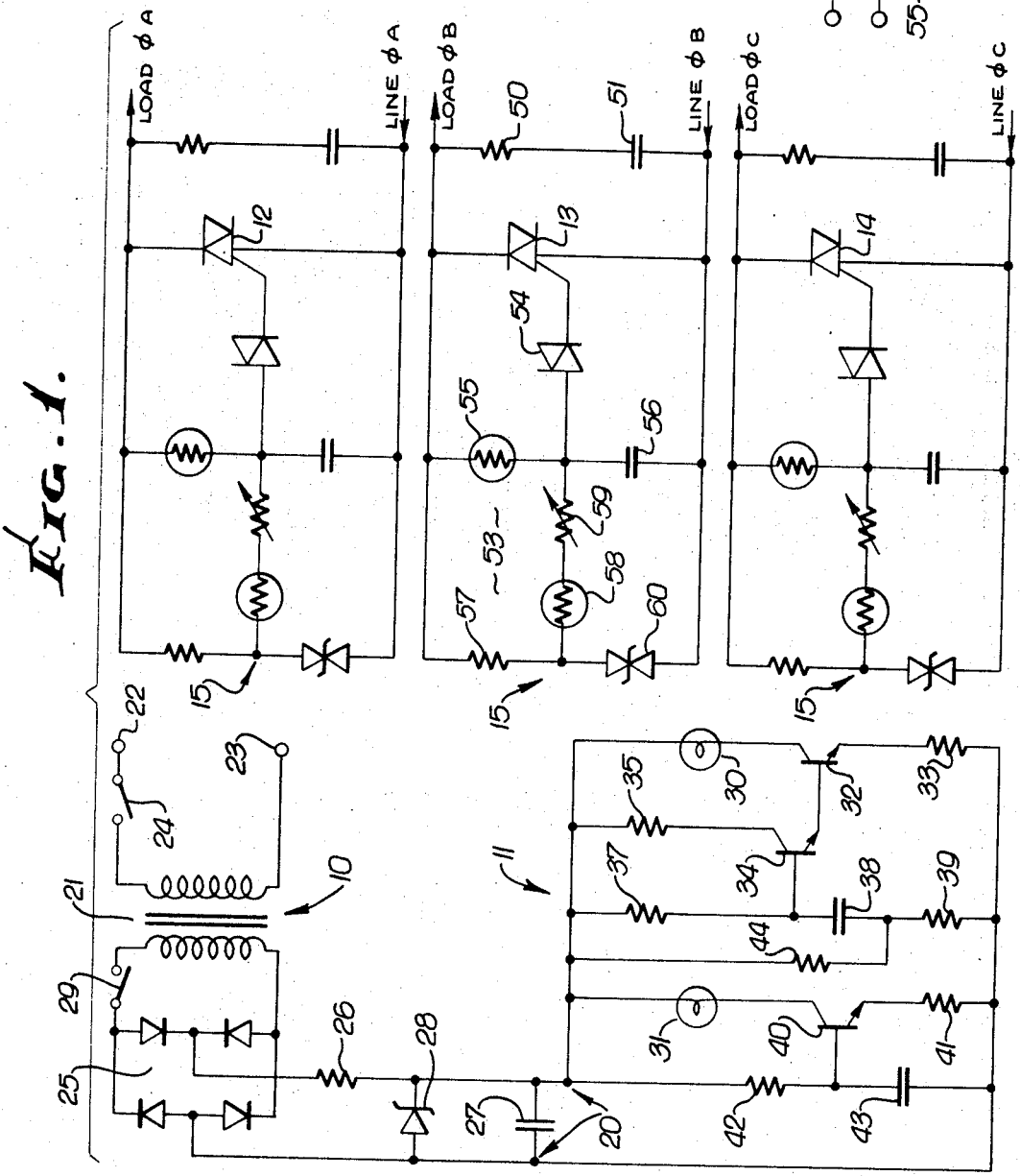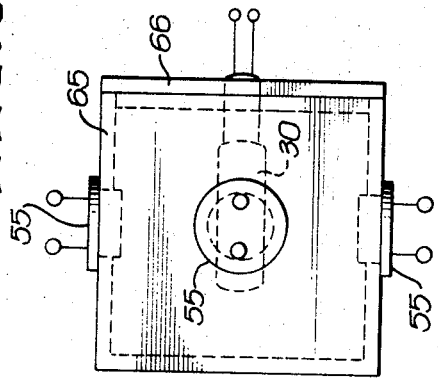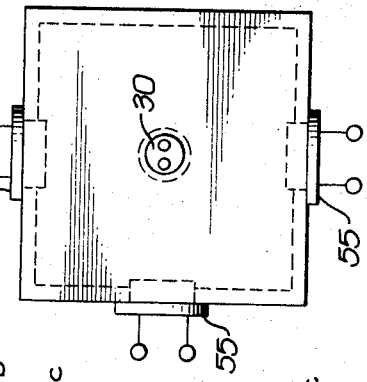

SOLID STATE CONTROLLER

This invention relates to starting or turning on power to electrical loads, particularly larger loads which have high inrush currents when directly connected to the line. The current practice in motor starting and tungsten lamp turn on is to directly connect the load to the line, with resulting current surges and electrical and magnetic transients which may damage or disturb the loads and other equipment. A typical example is in the starting of a three phase squirrel cage electric motor where the initial current when the starter contacts are closed may be six times the steady state current. In another example, the inrush current to a tungstem lamp load may be as much as fifteen times the steady load current because of the low resistance of the cold filaments at switch closure. Typically the lamp transients will exist for a few cycles of a 60 cycle per second source.

Whether the high starting current condition lasts for a few cycles as with a pure resistive lamp load, or a minute or more as with a large electric motor, or an intermediate period as with a transformer load, it is desirable to effect slow turn on or buildup of current, and also in many instances, slow turn off or decay of current.

Current control is achieved with thyristors, such as four layer diodes, silicon controlled rectifiers and triacs. However, instantaneous switching of thyristors under high current conditions often results in excessive heating and other damage to the device.

Accordingly it is an object of the present invention to provide a new and improved circuit for controlling buildup of current to an electrical load, which circuit is particularly suitable for use with larger loads such as one kw, three horsepower and greater. A further object is to provide such a circuit which controls the current buildup at turn on and current decay at turn off to effectively produce slow turn on and slow turn off, eliminating current transients, i.e,. providing a gradual increase of current from zero to steady state at turn on and a gradual decrease from steady state to zero at turn off.

It is a particular object of the invention to provide such a circuit which may be all solid state components, and one which utilizes radiation coupling between a low voltage, low power time delay section and a high voltage, high power output section. A further object is to provide such a circuit incorporating an RC time delay circuit, the time constant of which may be selected to provide any desired length of time for the turn on and turn off operations.

It is a further object of the invention to provide in such a circuit, a two-step delay wherein current buildup to a first level may be accomplished in a first controlled period of time and further current buildup to the steady state condition is accomplished in a second period of time. Another object is to provide such a circuit which may be used with single phase and three phase systems. One additional object is to provide a new and improved radiation coupler particularly suited for multiple single phase, two phase and three phase systems.

Other objects, advantages, features and results will more fully appear in the course of the following description where the drawing merely shows and the description merely describes preferred embodiments of the present invention which are given by way of illustration or example.

In the drawing:

FIG. 1 is an electrical schematic of a circuit incorporating the presently preferred embodiment of the invention for a starter for a three phase motor;

FIG. 2 is a top view of a three phase radiation coupler for use with the circuit of FIG. 1; and FIG. 3 is a top view of the coupler of FIG. 2.

The circuit of FIG. 1 includes a power supply 10, a lamp circuit 11, and three thyristors 12, 13, 14 and for the three phases A, B, C, respectively, with a switching circuit 15 for each thyristor.

The power supply 10 may be conventional and provides a regulated d.c. voltage at 20 for the lamp circuit 11. Typically the power supply may include a stepdown transformer 21 with the primary connected to line terminals 22, 23 via an on-off switch 24. The transformer secondary is connected to a full wave rectifier 25 with a series resistor 26 and a shunt capacitor 27 in the filter circuit and with a zener diode 28 to provide voltage regulation. An on-off switch 29 may be connected at the secondary for remote, low voltage operation if desired.

The lamp circuit 11 includes radiation sources 30, 31, which typically may be incandescent lamps, but which may alternatively be light emitting diodes or other radiation sources as desired. A transistor 32 is connected in circuit with the lamp 30 and a resistor 33. Another transistor 34 is connected in series with a resistor 35 and to the base of the transistor 32. A resistor 37 is connected in series with a capacitor 38 and another resistor 39 across the voltage source, with the junction of resistor 37 and capacitor 38 connected to the base of transistor 34. A transistor 40 is connected in series with the lamp 31 and another resistor 41. A resistor 42 is connected in series with a capacitor 43 across the voltage source, with the junction of the resistor and capacitor connected to the base of the transistor 40. A resistor 44 is connected between the junction of the lamp 31 and transistor 40 and the junction of the capacitor 38 and resistor 39.

When switch 24 is closed, the capacitor 43 is charged through the resistor 42 from the output of the power supply appearing at 20. The current in the lamp 31 is controlled by the transistor 40, with the current increasing as the voltage at the base of the transistor 40, corresponding to the charge on the capacitor 43, increases. Hence the rate of increase of output of lamp 31 is a function of the time constant of the resistance-capacitance circuit 42, 43, which may be selected to give the desired delay. The intensity of the lamp output is a function of the lamp itself, the power supply voltage and the circuit components, and may be selected for the particular application.

In a similar manner, the capacitor 38 is charged from the d.c. supply through resistors 37, 39 to control the current in the transistor 34 which in turn controls the current in the transistor 32 and the lamp 30. The resistor 44 in combination with resistor 39 provides d.c. pedestal such that lamp 30 begins to turn on just after lamp 31 approaches maximum allowable brightness. The transistor 34 supplies added isolation so that the charging time of capacitor 38 through resistor 37 is not affected by the loading impedance of transistor 32. The rate of increase of output of the lamp 30 is a function of the time constant of the resistance-capacitance circuit 37, 38, 39, and the intensity of the lamp output is determined as with the lamp 31.

The preferred lamp circuit shown in FIG. 1 provides a two step delay in power turn on as will be described. If only a single delay is desired, one of the lamps and associated circuitry may be omitted. Typically in the two step delay configuration, the delay for one lamp is quite different from that for the other, and in the embodiment illustrated for control of an induction motor, the delay for the lamp 31 is in the order of a few cycles and in the delay in the lamp 30 is in the order of thirty seconds.

The lamp circuit 11 is a low voltage, low power circuit which is electrically isolated from the three phase line, the controlled rectifiers and the load. Any type of switching which provides a voltage at 20 may be utilized in lieu of the simple on-off switch 24, and the low voltage, low power lamp circuit is particularly suited for remote switching control.

The circuits for each of the thyristors 12, 13, 14 are the same, and one will be described. The thyristor 13 is connected between the line and load and may be any suitable thyristor and a triac is illustrated. A resistor 50 and a capacitor 51 are connected in parallel with the triac 13 for transient suppression. The switching unit 15 includes a phase shift network 53 and a trigger unit 54. The phase shift network includes a light sensitive resistor 55, typically a conventional photocell, in series with a capacitor 56. Also, a series circuit comprising a resistor 57, another light sensitive resistor 58 and a variable resistor 59 is connected in parallel with the resistor 55. Device 60 comprises two zener diodes, connected back to back, to establish a stable a.c. reference for network 53, such that fluctuations in line voltage will not adversely affect the timing.

The trigger unit 54 is connected between the phase shift network 53 and the control element of the triac 13 and provides a triggering pulse for turning the triac on or switching the triac into conduction. A unit 54 may be a conventional diac or similar component which can provide a triggering pulse in each cycle, depending upon the condition of the phase shift network. Alternatively, the unit 54 may be a conventional unit which provides a triggering pulse only at a zero crossing of the a.c. supply with control being achieved by varying the number of on cycles and off cycles per unit of time, as a function of the condition of the phase shift network.

The photocells 55 of the three switching units are disposed to receive radiation from the lamp 30, and the photocells 58 are positioned to receive radiation from the lamp 31. A preferred configuration for lamp and photocell mounting is shown in FIGS. 2 and 3. A cubicle container 65 is provided with a cover 66, with the lamp 30 mounted in the cover and projecting into the container, to position the lamp filament at the center of the container. The three photocells are mounted in the centers of three faces of the container, thereby positioning the photocells equidistant from the lamp. This container design provides a closed coupling between the lamp and photocells, with provision for equal radiation to each photocell from the centrally disposed lamp.

Photocells normally have a maximum resistance with no incident radiation, with the resistance decreasing to a minimum value as the incident radiation increases. Values for the components of the phase shift network are selected so that with no incident radiation on either photocell, the rectifier will not be turned on. When the lamp 31 is energized, radiation therefrom decreases the resistance of the photocells 58, changing the phase shift in the network 53 and providing a trigger pulse to turn on the rectifier. Similarly, when the lamp 30 is energized, the resistance of the photocells 55 is decreased providing rectifier turn on. The turn on time can be selected as desired by selecting the values for the various components in the circuit. In the particular embodiment illustrated, a resistance change from maximum to minimum of the photocell 58 produced in a few cycles by the current buildup in the lamp 31 will shift the phase of the network sufficiently to trigger the rectifier into conduction at a predetermined and adjustable phase angle of each half cycle. The change in resistance of the photocell 55 from maximum to minimum which occurs in approximately one minute during the increase in output from the lamp 30 will further change the phase in the network to maintain the triac in full conduction. The circuit operates in the same manner when the switch 24 is moved to the off or open condition, with the capacitors 38 and 43 discharging and providing corresponding delays in lamp output and triac conduction time. Where only a one step delay is utilized, with the lamp 31 omitted, the photocells 58 are omitted from the phase shift network.

One limiting factor in the use of thyristors is the operating temperature, with the heating due to internal resistance and the high current load. The present circuit permits operation of two thyristors in parallel providing twice the current rating with one-half the voltage drop. Problems normally encountered in operating two thyristors in parallel due to slight differences in turn on characteristics with a resultant full load on one thyristor, are avoided with the slow turn on feature provided by the present circuit. Some obvious advantages are achieved with the present circuit, including elimination of moving contacts found in conventional motor starters and the elimination of arcing which occurs when contacts are opened under load. Other advantages include infinite operating life, many times the cycling life, optimum design for hazardous environment (no arcing), functions equally well under water and at extreme altitudes and temperature ranges. As indicated previously, the circuit is suitable for use with resistive loads and with inductive loads. The circuit is especially adapted for connecting a large motor to a line where the load of the motor will put a significant load on the generator supplying the electric power. The time delay produced by the present circuit can be matched to the reaction time of the generator in responding to the additional load so that the generator picks up the gradually increased load without surge currents, transients or reduction in line voltage. Similarly, when the circuit is used for turning on power to a large lamp load, the delay in turn on can be matched to the increase in resistance of the lamps so that there is substantially no inrush current or electrical impact on the lamp filament.

I claim:

1. In a circuit for controlling buildup of power to a load, the combination of:
   a thyristor for connection in circuit between line and load, said thyristor having a control element;
   a switching unit connected to said control element for turning said thyristor on and including a phase shift network for varying the time of thyristor turn on, said network including a first resistor having a resistance varying as a function of received radiation;
a first radiation source connected in circuit with a first current control unit, with radiation from said first source directed to said first resistor;
a first RC delay circuit for said first current control unit for increasing current through said current control unit to said first radiation source;
a voltage source; and
means for connecting said voltage source across said first delay circuit for charging the capacitance thereof, with the current to said first radiation source increasing as said capacitance charges to increase the on time of said thyristor.

2. A circuit as defined in claim 1 wherein said current control unit includes a transistor with emitter and collector in series with said first radiation source, with said first delay circuit connected to the transistor base for controlling current in said first radiation source.

3. A circuit as defined in claim 1 wherein said thyristor is a triac.

4. A circuit as defined in claim 1 wherein said controlled rectifier comprises two thyristors connected in parallel.

5. A circuit as defined in claim 1 for operation with a three phase system and including three of said thyristors and switching units, with radiation from said first radiation source directed to the first resistors of each of the three switching unit networks.

6. A circuit as defined in claim 5 including a closed container, with the first resistors of each of the three phase shift networks mounted in the walls of said container, and with said first radiation source mounted within said container spaced substantially equally from each of the first resistors.

7. A circuit as defined in claim 6 wherein said container has a square cross section with four faces, with said first resistors mounted in three of said faces.

8. A circuit as defined in claim 1 including:
a second resistor in said phase shift network and having a resistance varying as a function of received radiation;
a second radiation source connected in circuit with a second current control unit, with radiation from said second source directed to said second resistor;
a second RC delay circuit for said second current control unit for increasing current through said unit to said second radiation source; and
means for connecting said voltage source across said second delay circuit for charging the capacitance thereof, with the current to said second radiation source increasing as said capacitance charges to increase the on time of said thyristor.

9. A circuit as defined in claim 8 with said phase shift network connected across said thyristor and with said first and second resistors connected in parallel.

10. A circuit as defined in claim 8 including means connecting said second current control unit to said first delay circuit.

11. A circuit as defined in claim 10 wherein said second current control unit and radiation source and said second phase shift network including said second resistor are selected such that fully charging the capacitance of said second delay circuit turns said thyristor on only for a portion of the available on time.

12. A circuit as defined in claim 8 wherein said second current control unit and radiation source and said second phase shift network including said second resistor are selected such that fully charging the capacitance of said second delay circuit turns said thyristor on at a predetermined and adjustable phase angle of each half cycle.

* * * * *